(12) United States Patent
Gyori

(10) Patent No.: US 6,709,142 B2
(45) Date of Patent: Mar. 23, 2004

(54) NIGHTTIME GLOVE

(76) Inventor: Csaba Gyori, 172 Mason Road, Stratford, PEI (CA), C1B 2G2

( * ) Notice: Subject to any disclaimer, the term of this patent is extended or adjusted under 35 U.S.C. 154(b) by 0 days.

(21) Appl. No.: 10/340,715

(22) Filed: Jan. 13, 2003

(65) Prior Publication Data

US 2003/0235048 A1 Dec. 25, 2003

(51) Int. Cl.[7] ............................................. F21V 21/08
(52) U.S. Cl. ............................ 362/554; 362/570; 362/103
(58) Field of Search ............................... 362/103, 554, 362/570, 253; 2/160

(56) References Cited

U.S. PATENT DOCUMENTS

| | | | |
|---|---|---|---|
| 1,199,710 A | 9/1916 | Newton | |
| 1,215,389 A | 2/1917 | Lauray | |
| 1,230,943 A | 6/1917 | Sundh | |
| 3,638,011 A | 1/1972 | Bain et al. | |
| 3,644,725 A | 2/1972 | Lochridge, Jr. | |
| 5,086,378 A | 2/1992 | Prince | |
| 5,097,396 A | 3/1992 | Myers | |
| 5,177,467 A | 1/1993 | Chung-Piao | |
| 5,283,722 A | 2/1994 | Koenen et al. | |
| 5,424,922 A | 6/1995 | Wise | |
| 5,430,621 A | 7/1995 | Raskas | |
| 5,448,458 A * | 9/1995 | Smyly, Jr. ................. | 362/570 |
| 5,514,861 A * | 5/1996 | Swartz et al. ............ | 235/462.44 |
| 5,535,105 A | 7/1996 | Koenen Myers | |
| 5,580,154 A | 12/1996 | Coulter et al. | |
| 5,706,026 A * | 1/1998 | Kent et al. ................. | 345/156 |
| 5,722,757 A | 3/1998 | Chien | |
| 5,816,676 A | 10/1998 | Koenen Myers | |
| 5,921,674 A | 7/1999 | Koczi | |
| 6,006,357 A | 12/1999 | Mead | |
| 6,217,188 B1 | 4/2001 | Wainwright et al. | |
| 6,302,570 B1 | 10/2001 | Petell et al. | |
| 6,592,235 B1 * | 7/2003 | Mayo ......................... | 362/103 |

* cited by examiner

Primary Examiner—Thomas M. Sember
(74) Attorney, Agent, or Firm—Mario Theriault

(57) ABSTRACT

The illuminated glove has an outside layer, an inside liner and a fibre-optic arrangement mounted there between. This fibre-optic arrangement comprises fibre-optic ribbons extending along the fingers of the glove under the outside layer. Portion of these ribbons are visible through openings in the outside layer. A light source is mounted at the base of the thumb. A power source including a battery and a pressure sensitive switch are mounted in the cuff of the glove. A plurality of optical fibres extend loosely over the back-of-the-hand portion and the hand-knuckle region of the glove between the light source and the fibre-optic ribbons. A slack or loose bend is provided in the plurality of optical fibres for reducing hand stiffness and fibre tension when the fingers of the glove are flexed. Preferably, the slack or the loose bend is an offset between and relative to the light source and the fingers.

20 Claims, 4 Drawing Sheets

NIGHTTIME GLOVE

FIELD OF THE INVENTION

This invention pertains to illuminated gloves and more particularly, it pertains to self-contained fibre-optic arrangements mounted inside illuminated gloves.

BACKGROUND OF THE INVENTION

It is believed that the earliest models of illuminated gloves were used by trainmen to signal train conductors. In the early days of the automobile, illuminated gloves were also used by operators to indicate an intention to slow down or to change direction. More recently, surgical gloves with a finger-mounted light were developed to aid surgeons performing delicate surgical operations.

Although illuminated gloves are very practical apparels, their amusement character makes them particularly suitable for use as toys. This amusement character is kept at its best when the illumination system is well dissimulated inside the glove and its lighting produces an effect of surprise. Basically, this is one of the objectives of the present invention.

In regard to the prior art in this field, the following documents represent a good inventory of the illuminated gloves preceding the present invention. These documents are divided in three groups as follows.

The illuminated gloves in the first group have electrical wiring therein with light bulbs mounted at various places on the glove. A switch is provided and is usually operable by the thumb and the index finger. A battery is mounted in the wrist pad of the glove. Examples of the illuminated gloves in this first group are available in the following US Patents.

- U.S. Pat. No. 1,199,710 issued on Sep. 26, 1916 to W. J. Newton;
- U.S. Pat. No. 1,215,389 issued on Feb.,13, 1917 to P. E. Lauray;
- U.S. Pat. No. 1,230,943 issued on Jun. 26, 1917 to A. Sundh;
- U.S. Pat. No. 3,638,011 issued on Jan. 25, 1972 to M. H. Bain et al.;
- U.S. Pat. No. 5,177,467 issued on Jan. 5, 1993 to T. Chung-Piao;
- U.S. Pat. No. 5,580,154 issued on Dec. 3, 1996 to J. D. Coulter et al.;
- U.S. Pat. No. 6,006,357 issued on Dec. 28, 1999 to J. E. Mead;

Some of the illuminated gloves of the prior art have an optical fibre mounted along one finger thereof with a light source at the tip of that finger, such as the surgeon glove mentioned above. Examples of these gloves are available in the following documents

- U.S. Pat. No. 5,086,378 issued on Feb. 4, 1992 to M. W. Prince;
- U.S. Pat. No. 5,283,722 issued on Feb. 1, 1994 to H. P. Koenen et al.;
- U.S. Pat. No. 5,535,105 issued on Jul. 9, 1996 to H. P. Koenen Myers et al.;
- U.S. Pat. No. 5,816,676 issued on Oct. 6, 1998 to H. P. Koenen Myers et al.;

Finally, the prior art documents also disclose another type of illuminated glove having a single light circle mounted on the back-of-the-hand portion. The light circle is made of a plurality of optical fibers originating from a single light source inside the cuff of the glove. This type of glove is illustrated and described in the U.S. Pat. No. 5,424,922 issued on Jun. 13, 1995 to J. S. Wise;

Although several solutions have been proposed in the past to illuminate a glove, it is believed that there is still a market demand for an illuminated glove which has the flexibility, feeling and appearance of an ordinary glove when the illumination system is not used. There is also a market need for a glove illumination system that is more appropriate for dissimulation inside amusement gloves for youths.

SUMMARY OF THE INVENTION

In the present invention, there is provided an illuminated glove in which is incorporated a fibre-optic arrangement. This fibre-optic arrangement is thin and flexible over the back-of-the-hand portion and the hand-knuckle region of the glove. The fibre-optic arrangement has extensible sections therein for reducing flexion stiffness and fibre tension. The glove according to the present invention has the appearance of an ordinary glove when the illumination feature is unlit. In use, it has the feeling, flexibility and endurance of an ordinary glove. The mystical aspect of this glove when lit in the dark is thereby undiminished.

Broadly, in accordance with one feature of the present invention, there is provided a glove having an outside layer, a wrist band, at least one finger, a back-of-the-hand portion and a hand-knuckle region between the wrist band and the finger. A fibre-optic arrangement is mounted under the outside layer. This fibre-optic arrangement is affixed to the outside layer and comprises a fibre-optic ribbon extending along the finger. A portion of this ribbon is visible through an opening in the outside layer. A light source is mounted near the wrist band, and a plurality of optical fibres extend loosely over the back-of-the-hand portion and the hand-knuckle region, from the light source to the fibre-optic ribbon. The glove according to the present invention further comprises a slack or a loose bend in the plurality of optical fibres for allowing a flexion of the finger without applying any tension on the light source. Preferably, the slack or the loose bend is an offset between and relative to the light source and the finger.

In a further aspect of the present invention, the fibre-optic arrangement illuminates openings on all four fingers and the thumb of the glove. Although the plurality of optical fibres in this aspect of the invention contains five bundles with a loose bend in each one, this fibre-optic arrangement has been found particularly advantageous for maintaining the flexibility of the glove substantially the same as a common non-illuminated glove.

In accordance with another feature of the present invention, the glove has an inside lining and the fibre-optic arrangement is mounted between the inside lining and the outside layer. Each fibre-optic ribbon comprises a backing piece which is glued to the inside lining, and the outside layer is glued to a top surface of the fibre-optic ribbon.

In accordance with yet another aspect of the present invention, the glove has a cuff adjacent the wrist band, and a switch and a control circuit including a battery are mounted in that cuff. An extensible wiring bend is provided between the switch and the light source. The illumination system is thereby self contained and is controllable using the switch.

In a further aspect, each fibre-optic ribbon protrudes through the outside layer on an extremity of a respective finger, thereby defining a finger-end illumination variant of the present invention. Preferably, each fibre-optic ribbon has a lens on the end thereof to enhance the illumination of this first variant. In accordance with a second illumination variant, the outside layer of the glove has openings along the top surface of each finger and the fibre-optic ribbons comprise reflective backings thereunder. The ribbons are visible through the top openings, to produce a finger-top illumination.

In accordance with a third illumination variant, the outside layer has openings over the back-of-the-hand portion of the glove, and the fibre-optic arrangement has a reflective backing over the back-of-the-hand region such that the plurality of optical fibres are visible through these back-of-the-hand openings to produce a back-of-the-hand illumination pattern. Preferably this pattern defines the logo of a sport team, or a symbol representing the character of a story book or the hero of a futuristic movie, in order to enhance the amusing aspect of the glove.

Still another feature of the illuminated glove of the present invention is that it is susceptible of a low cost of manufacture with regard to both materials and labour, and which accordingly is then susceptible of low price of salt to the consumer, thereby making such glove economically available to the public.

Other advantages and novel features of the present invention will become apparent from the following detailed description of the preferred embodiment.

BRIEF DESCRIPTION OF THE DRAWINGS

One embodiment of the present invention is illustrated with three options or variants in the accompanying drawings, in which like numerals denote like parts throughout the several views, and in which.

DESCRIPTION OF THE PREFERRED EMBODIMENT

Figure 1:
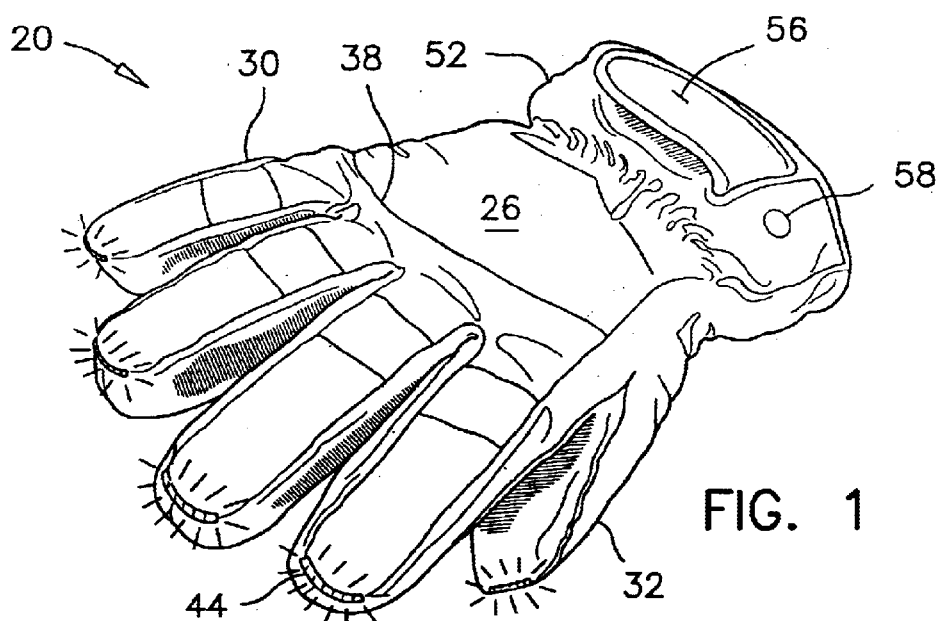
FIG. 1 is a perspective view of the illuminated glove according to the present invention, showing the finger-end illumination variant.

While this invention is susceptible of embodiment in many different forms, there is shown in the drawings and will be described in details herein one specific embodiment and three illumination variants, with the understanding that the present disclosure is to be considered as an example of the principles of the invention and is not intended to limit the invention to the embodiment illustrated and described.

Figure 2:
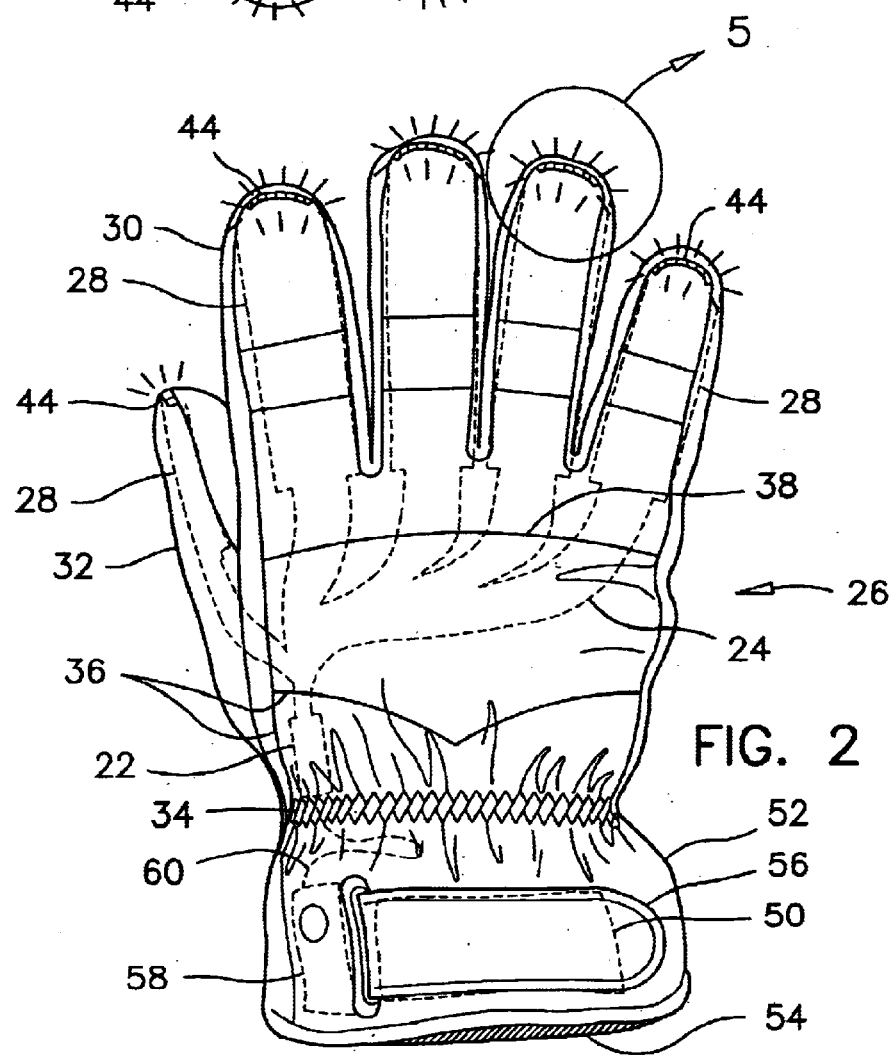
FIG. 2 is a top view of the illuminated glove, with the fibre-optic arrangement being shown in dash lines.
Figure 3:
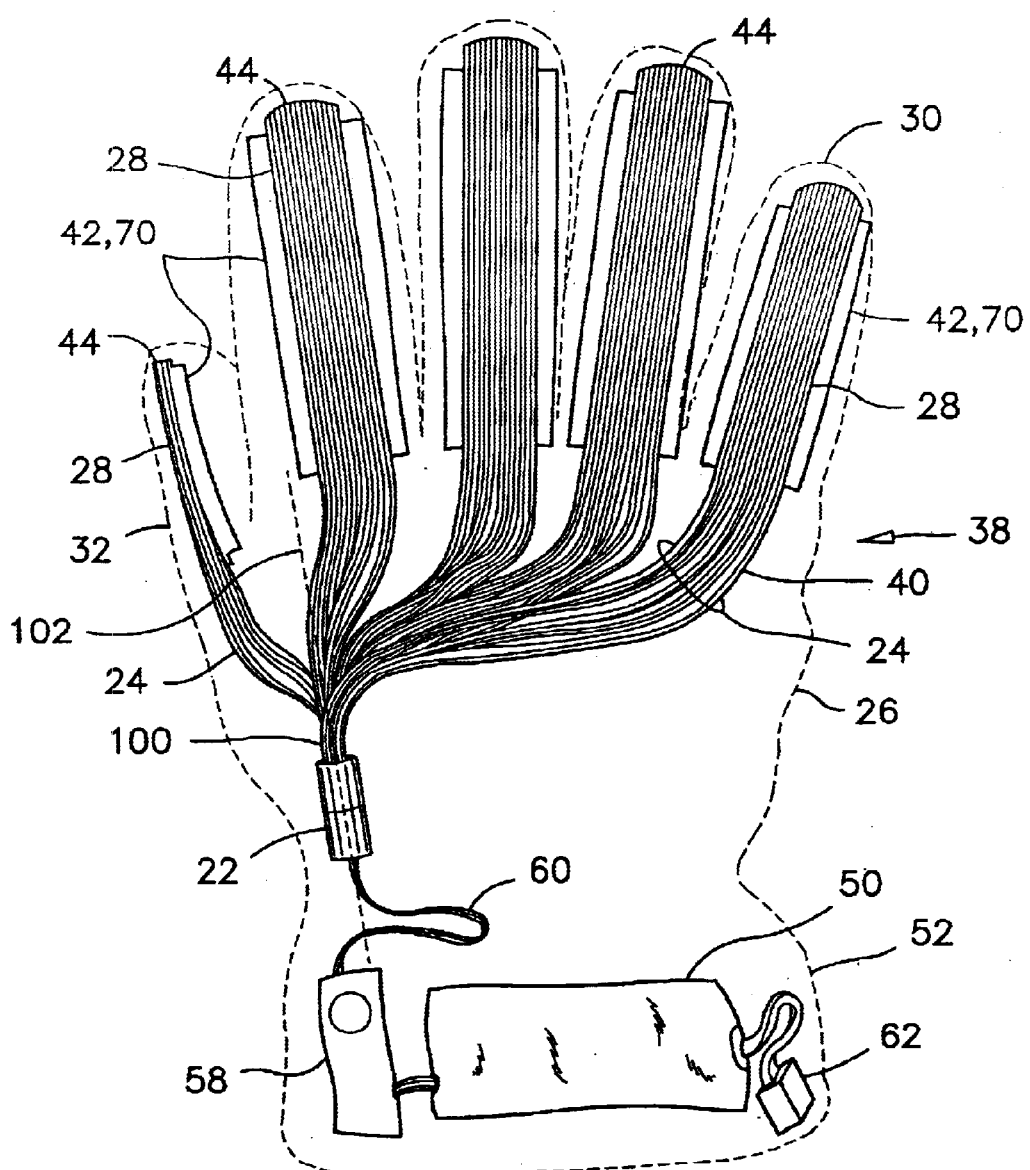
FIG. 3 is a top view of the fibre-optic arrangement mounted inside the illuminated glove, with the glove being shown in dash lines.

Referring to the FIGS. 1, 2 and 3, the illuminated glove 20 has the appearance of an ordinary glove. A fibre-optic arrangement is mounted therein and is made of a plurality of thin optical fibres originating from a common light source 22. The optical fibres extend from the light source 22 into five offset bundles 24 over the back-of-the-hand portion 26 of the glove. The offset bundles 24 extends to form five ribbons 28 lining the top portion of each finger 30 and the thumb 32.

In the preferred fibre-optic arrangement, the light source 22 is held over the base of the thumb 32, near the elastic wrist band 34 of the glove. The light source 22 is a cylindrical element which is held substantially parallel with the axis of the index finger of the glove. The light source 22 is retained in its position and orientation, between the inside lining and outside layer of the glove, and between nearby stitches 36 and the wrist band 34, or otherwise.

The word "offset" is used herein because each bundle 24 describes an offset in the optical fibres between and relative to the alignment of the light source 22 and the respective finger and thumb 30, 32. It will be appreciated that this offset provides a slack means to eliminate any tension on the light source 22, or any stiffness in the back-of-the-hand portion of the glove when the fingers of the glove are flexed. It will also be appreciated that another loose bend or undulation in the alignment of the optical fibres would constitute an equivalent arrangement to provide substantially the same result.

In this preferred embodiment, each offset bundle 24 extends loosely between the inside lining and the outside layer of the glove over the back-of-the-hand portion 26 and especially over the hand-knuckle region of the glove, to maintain the extensibility of the glove during flexion of the wearer's hand. For reference, the hand-knuckle region of the glove extends from the base of the fingers 30 to a region on the back-of-the-hand portion 26 slightly overlapping the seam 38 of the glove. The optical fibres 40 in each offset bundle 24 are laid loosely over the hand-knuckle region 38 and the back-of-the-hand portion 26, such that they can move laterally independently from each other, and longitudinally in unison with each other during the flexion of the hand or the fingers of the glove user.

Each ribbon 28 consists of a plurality of optical fibres 40 laid side by side on an adhesive backing 42. Each ribbon 28 extends the fill length of each finger 30 and the thumb 32. In the first illumination variant, the end 44 of each ribbon protrudes through the outside layer of the glove and defines an illuminated arc at the end of the respective finger 30 and thumb 32, as illustrated in FIGS. 1 and 2.

A power source 50 containing a battery and a control circuit is mounted inside the cuff 52 of the glove, in a compartment which is accessible from an opening 54 along the rim of the cuff 52. The battery and the control circuit 50 are contained in a flexible package such that the malleability of the cuff and the usability of the adjustable strap 56 on that cuff are substantially maintained.

A switch module 58 is mounted on the inside segment of the cuff near the light source 22. The switch 58 is connected between the control circuit 50 and the light source 22. The switch 58 is a pressure-sensitive switch which, can be turned on or off by the pressure of the finger, or of the chin of the user for example.

In the preferred embodiment, the individual fibres 40 are two hundred and fifty (250) micron in diameter, and each ribbon 28 contains sixty (60) fibres laid side by side over the adhesive backing 42. It has been found that fibres of that size loosely laid, are substantially impalpable over the hand-knuckle region and the back-of-the-hand portion of the glove. It has been found that the layout of optical fibres 40 over the back-of-the-hand portion 26 and the hand-knuckle region 38, with the above fibre specifications, causes the fibre-optic arrangement to be so malleable that it is almost imperceptible during the movement of the hand.

In order to further maintain the flexibility of the glove, an extensible wiring bend 60 is provided between the light source 22 and the switch module 58. The wiring bend 60 extends under the elastic wrist band 34 of the glove. This wiring bend 60 is advantageous for preventing the application of any tension between the switch module 58 and the light source 22, especially when the elastic light band 34 is stretched out, such as when the glove is being put on or taken off.

The control circuit 50 may also comprise a connector 62 to engage with a battery charger or a solar panel, for recharging the battery when used up. This connector and the rechargeable aspect of the control circuit do not constitute the focus of the present invention, and therefore are not discussed in further details.

Figure 4:
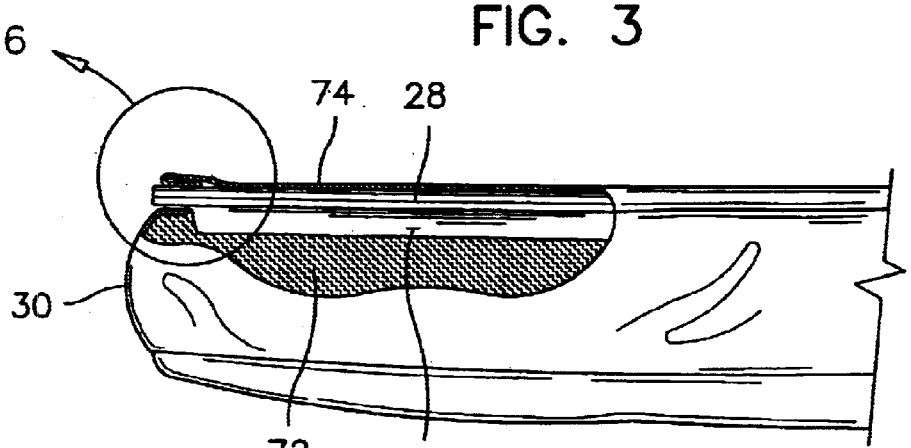
FIG. 4 is a partial cross-section side view of one finger of the illuminated glove.

As briefly mentioned, each ribbon 28 is made of about sixty optical fibres mounted side-by-side on an adhesive backing 42. The preferred backing 42 has wings 70 along its sides, which can be attached by stitches or otherwise to the inside lining, the outside layer or both. In the preferred embodiment, the backing 42 and the wings 70 are glued to the inside lining 72 of the glove, and the outside layer 74 of the glove is glued to the top surface of the ribbon 28, as illustrated in FIG. 4.

The gluing of the ribbons 28 to the fingers of the glove is advantageous for preventing the separation of the ribbons from the fingers of the glove when the glove is being removed for example, and when tension is applied to one or more fingers. Furthermore, each ribbon 28 provides protective padding over each finger, which makes the glove appropriate for used in the performance of some sports.

Figure 5:
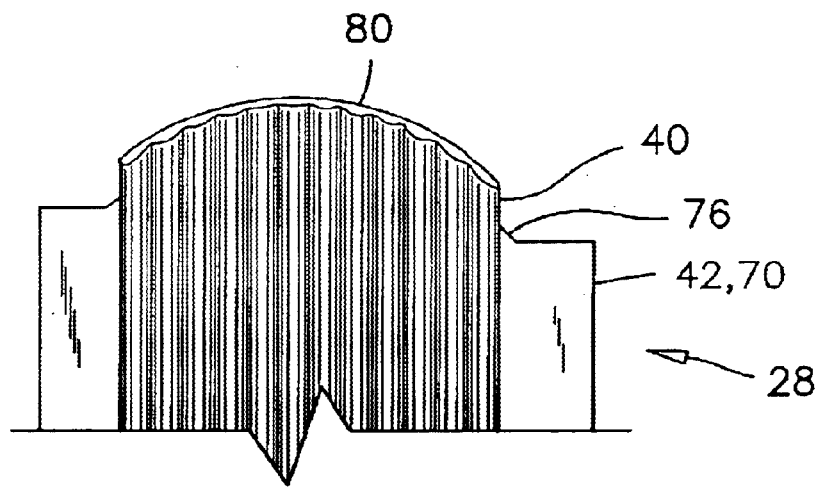
FIG. 5 is an enlarged view of a finger tip in the fibre-optic arrangement in a region indicated by detail circle 5 in FIG. 2, basically.
Figure 6:
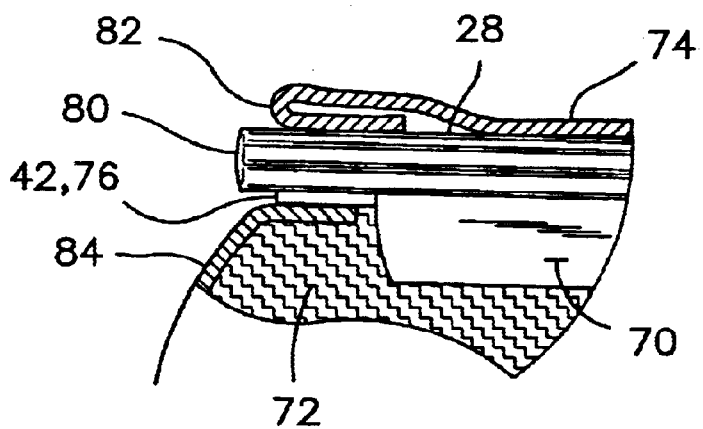
FIG. 6 is an enlarged cross-section side view of a finger tip, as seen in the detail circle 6, in FIG. 4.

Referring now to FIGS. 5 and 6, the optical fibres 40 extend beyond the forward edge 76 of the adhesive backing 42. During the manufacturing of the fibre-optic structure, the ends of the fibres 40 are melted together using a hot metal blade such that the tips of the fibres in a same ribbon 28 form an even surface 80 over the end of the ribbon 28. This treatment removes the sharp edges and irregular surfaces on the fibre tips, and forms a substantially convex lens 80 over the end of each ribbon 28 to enhance the illumination of each finger end 44.

Referring specifically to FIG. 6, the upper end segment 82 of the outside layer 74 on a finger-end opening is preferably folded over itself and glued to the top surface of the ribbon 28. The lower segment 84 of the outside layer 74 is glued to the backing 42. The backing 42 and the wings 70 are preferably glued to the inside lining 72.

Figure 7:
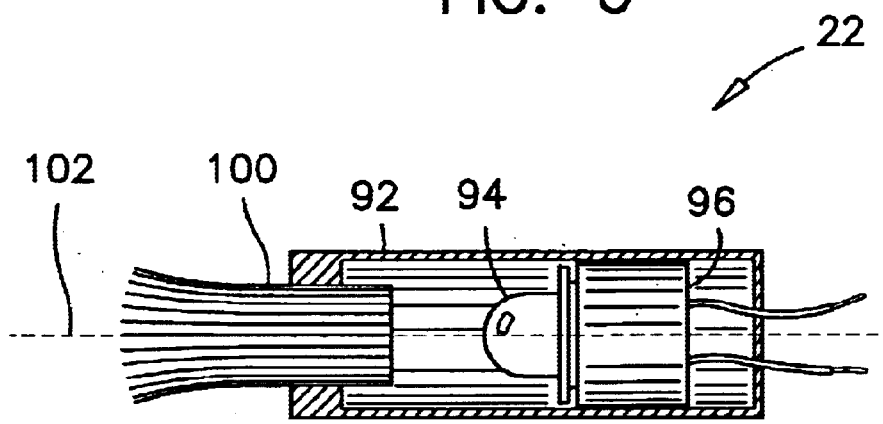
FIG. 7 is a cross-section side view of the light source comprised in the preferred fibre-optic arrangement.

The light source 22 as illustrated in FIG. 7, consists of a light emitting diode 94 (LED) and a lead spacer 96, mounted in a cylindrical LED reflecting housing 92. The optical fibres 40 from the five offset bundles 24 originate from a common core 100 extending inside the LED reflecting housing 92. This core may be glued together to form a cylindrical shape. For reference purposes, the light source has a light axis 102 extending along the longitudinal axis of the reflecting housing 92. The reflecting housing is mounted inside the glove with the light axis 102 extending substantially parallel with the index finger of the glove as illustrated in FIG. 3. This placement of the light source has been found convenient for maintaining the comfort of the glove.

Figure 8:
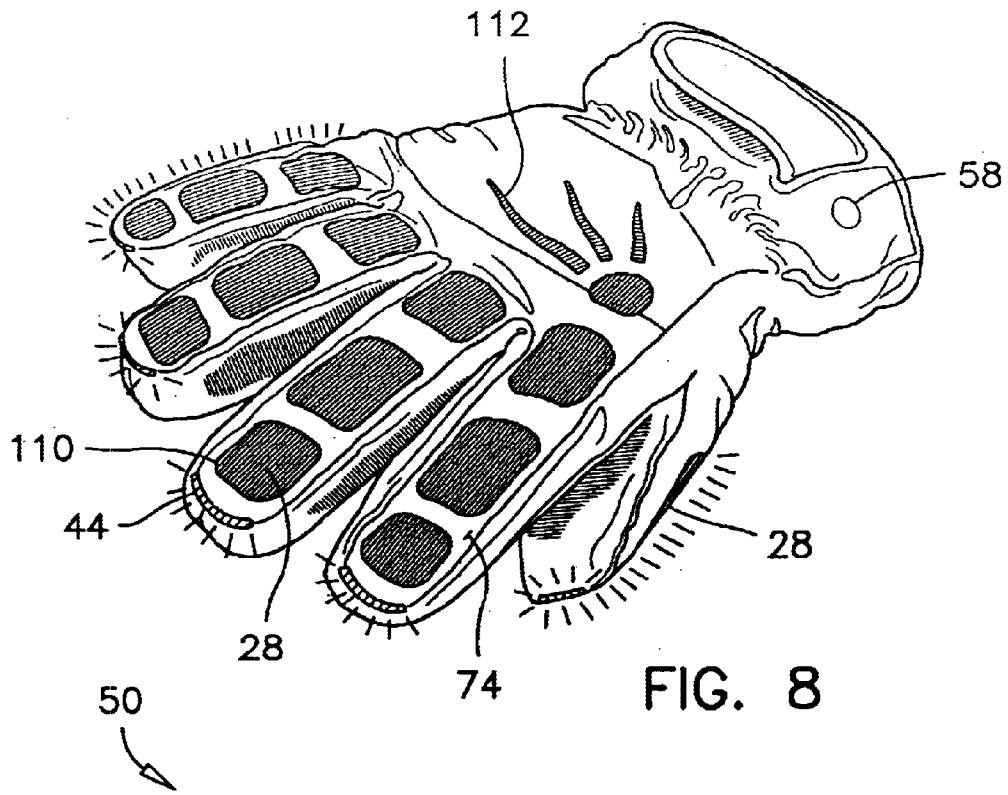
FIG. 8 is a perspective view of the illuminated glove showing in combination the finger-end illumination variant, the finger-top illumination variant and the hand-top illumination variant.

A second glove illumination variant is illustrated in FIG. 8. In this variant, the adhesive backing under each ribbon 28 is made of a reflective material to reflect light transversely through the fibres, and the outside layer 74 has openings 110 therein on the top of each finger and the thumb, to expose portions of these ribbons 28, thereby providing finger-top illumination.

Other reflective backing can also be mounted under-the offset bundles 24 of the fibre-optic arrangement, and other openings 112 in the outside layer of the glove can be made to provide hand-top illumination over the back-of-the-hand portion of the glove as illustrated in FIG. 8. This reflective backing, however, should be non-adhesive to maintain the flexibility of the offset bundles 24 over the back-of-the-hand portion and over the hand-knuckle region of the glove. Although the illustrated hand-top illumination 112 has the shape representing a star, it will be appreciated that other shapes can be used, such as the logo of a national hockey team or the initials of a children hero, for example.

In the illustration of FIG. 8, the finger-end illumination, the finger-top illumination and the hand-top illumination variants are illustrated together. It will be appreciated, however, that any one of these illumination variants can be used alone.

Figure 9:
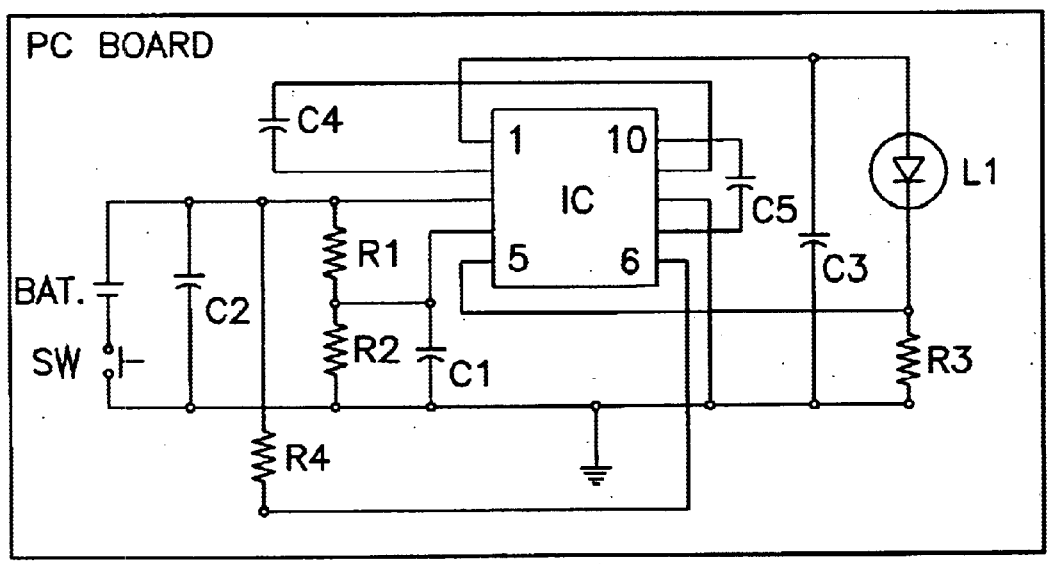
FIG. 9 is a circuit diagram of the power and light source mounted in the cuff and over the base of the thumb in the preferred illuminated glove.

A diagram of the control circuit SO, the switch 58 and the light source 22 is illustrated in FIG. 9. In tis diagram, the preferred components are shown in the Table 1 below. The suppliers shown in the table have representatives throughout the world and are well known to those skilled in the art.

TABLE 1

| Ref. | Description | Value | Part # | Suppliers |
| --- | --- | --- | --- | --- |
| PC Board | PC Board | | 276–150 | Radio Shack |
| IC | LED Driver | | SP6682 | Sipex Corp. |
| LI | White LED | | NSPW500BS | Nichia Corp. |
| SW | Push Button Switch | | 519PB-ND | Digi-Key Corp. |
| Bat. | (3) AAAA Bat | | E96BP-2 | Energizer |
| C1 | Electrolytic Capacitor | 1 μf | 383–5351 | FAI Electronics |
| C2 | Electrolytic Capacitor | 1 μf | 383–5351 | FAI Electronics |
| C3 | Electrolytic Capacitor | 2.2 μf | 383–5375 | FAI Electronics |
| C4 | Ceramic Capacitor | 0.22 μf | 383–6542 | FAI Electronics |
| C5 | Ceramic Capacitor | 0.022 μf | 383–6521 | FAI Electronics |
| R1 | Carbon Film Resistor | 1.2 KΩ | 1.2 KEBK-ND | Digi-Key Corp. |
| R2 | Carbon Film Resistor | 593 Ω | 560 EBK-ND | Digi-Key Corp. |
| R3 | Carbon Film Resistor | 12 Ω | 12 EBK-ND | Digi-Key Corp |
| R4 | Carbon Film Resistor | 1 MΩ | 1.0 MEBK-ND | Digi-Key Corp |

It will be appreciated that other circuits are also considered to be part of the present inventive concept. These other circuits may comprise for example, a rechargeable battery circuit, a light-flashing circuit and a colour-selection circuit.

The preferred method for fabricating the fibre-optic arrangement consists of providing a light source 22, a switch 58 and a control circuit 50 including a battery; providing connections between the control circuit, the switch and the light source; and providing a plurality of optical fibres 40.

Using five pieces of adhesive backing material 42 having the respective length of each of four fingers and a thumb, forming five bundles and laying the optical fibres in each bundle side-by-side on a respective adhesive backing to form five ribbons 28, in which the optical fibres are retained to each other. The ends of these optical fibres should extend slightly beyond the end of the respective backing piece 42, as illustrated in FIGS. 3 to 6. The other ends of the optical fibres are grouped together 100 and inserted in the light source 22. The lengths of the optical fibres in each bundle are selected to form an offset or other loose bend between the fibre-optic ribbons and the light source when the fibre-optic arrangement is inserted inside a glove structure.

The preferred method for manufacturing the illuminated glove according to the present invention is to firstly lay the outside layer of the glove over the inside lining and sew the elastic wrist band 34 to retain the inside lining to the outside layer. Then, the light source 22, the offset bundles 24, the fibre-optic ribbons 28, the switch 58 and the extensible wiring bend 60 can be inserted between the inside lining and the outside layer. The outside layer can then be sewn to close the glove and to affix it to the inside lining, thereby enclosing the fibre-optic arrangement there between. During the sewing of the outside layer, a gap or opening 44 is left unsewn on the end of each finger and thumb. Each fibre-optic ribbon 28 is glued to the inside lining or outside layer or to both lining and layer through these openings. The openings are closed against the ribbons, and the ribbons are heat treated to form the lens 80. A last step in the manufacturing process, consists of inserting the control circuit 50 inside the cuff of the glove and to connected it to the switch 58.

It will be appreciated that numerous other manufacturing processes can also be used to manufacture the fibre-optic arrangement and the glove according to the present invention, and therefore, the above methods are provided herein as basic procedures from which improvements can emerge.

The market applications for the illuminated glove according to the present invention are numerous and include for examples, signal gloves for police officers, gloves for other officials writing tickets in the dark, camping gloves, evening gloves, sport gloves, and finally, amusement gloves for playing evening games or for enhancing a child's anticipation of bedtime.

As to other manner of fabrication, usage and operation of the present invention, the same should be apparent from the above description and accompanying drawings, and accordingly further discussion relative to the manner of manufacture, usage and operation of the invention would be considered repetitious and is not provided.

While one embodiment of the present invention has been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A glove having an outside layer, an opening in said outside layer, a wrist band, a finger, a back-of-the-hand portion extending from said wrist band toward said finger, and a hand-knuckle region between said back-of-the-hand portion and said finger; said glove further comprising;
   a fibre-optic arrangement mounted under said outside layer; said fibre-optic arrangement comprising;
   a fibre-optic ribbon extending along said finger and affixed to said outside layer with a portion thereof being visible through said opening;
   a light source mounted near said wrist band;
   a plurality of optical fibres loosely laid over said back-of-the-hand portion and said hand-knuckle region between said light source and said fibre-optic ribbon; and
   slack means in said plurality of optical fibres for allowing a flexion of said finger without applying tension on said light source.

2. The glove as claimed in claim 1, further comprising a cuff adjacent said wrist band opposite said back-of-the-hand portion, a switch in said cuff, and an extensible wiring bend between said switch and said light source.

3. The glove as claimed in claim 2, wherein said slack means comprises an offset in said plurality of optical fibres relative to an alignment of said light source and said finger.

4. The glove as claimed in claim 1, further comprising an inside lining and said fibre-optic arrangement is mounted between said inside lining and said outside layer.

5. The glove as claimed is claim 4, wherein said fibre-optic ribbon comprises a backing piece glued to said inside lining.

6. The glove as claimed in claim 5, wherein said outside layer is glued to a top surface of said fibre-optic ribbon.

7. The glove as claimed in claim 1 wherein said opening is on an extremity of said finger, and said fibre-optic ribbon protrudes through said opening.

8. The glove as claimed in claim 2, further comprising a fibre-optic control circuit mounted inside said cuff.

9. The glove as claimed in claim 8, wherein said cuff has a rim and a compartment therein having an opening along said rim, and said control circuit is mounted in said compartment.

10. The glove as claimed in claim 8, wherein said control circuit is made of flexible material.

11. An illuminated glove having an outside layer, an inside lining, four fingers including an index finger, a thumb, a cuff, a back-of-the-hand portion extending from said cuff toward said fingers, and a hand-knuckle region between said back-of-the-hand portion and said fingers; said glove further comprising;
   a fibre-optic arrangement mounted between said inside lining and said outside layer, said fibre-optic arrangement comprising;
   fibre-optic ribbons extending along said fingers and affixed to one of said outside layer and inside lining;
   a light source mounted loosely over said back-of-the-hand portion near a base of said thumb, said light source having an elongated shape aligned substantially parallel with said index finger;
   a plurality of optical fibres loosely laid over said back-of-the-hand portion and said hand-knuckle region between said light source and said ribbons;
   each of said optical fibres defining an offset between each of said fibre-optic ribbons and said light source;
   a power source mounted in said cuff;
   a connection between said power source and said light source; and
   said outside layer having openings therein on each of said fingers and each of said fibre-optic ribbons having an end registering with one of said openings, such that when said light source is lit, a light transmitted along said optical fibres is visible through said openings.

12. The illuminated glove as claimed in claim 11, wherein each of said ends of said fibre-optic ribbons has a lens thereon.

13. The illuminated glove as claimed in claim 11, further comprising an additional fibre-optic ribbon extending over said thumb.

14. The illuminated glove as claimed in claim 11, wherein said:

connection between said power source and said light source comprises a pressure-sensitive switch.

15. The illuminated glove as claimed in claim 14, wherein said connection between said power source and said light source also comprises an expansion wiring bend between said switch and said light source.

16. An illuminated glove having an outside layer, an inside lining, four fingers including an index finger, a thumb, a cuff, a back-of-the-hand portion extending from said cuff toward said fingers, and a hand-knuckle region between said back-of-the-hand portion and said fingers; said glove further comprising;

a fibre-optic arrangement mounted between said inside lining and said outside layer; said fibre-optic arrangement comprising;

fibre-optic ribbons extending along said fingers and affixed to one of said outside layer and said inside lining;

a light source mounted over said back-of-the-hand portion near a base of said thumb;

a plurality of optical fibres extending between said light source and said fibre-optic ribbons;

a power source mounted in said cuff;

a connection between said power source and said light source; and said outside layer having an opening therein registering with at least one of said optical fibres and said fibre-optic ribbons for transmitting light from said light source through said opening.

17. The illuminated glove as claimed in claim 16, wherein said opening is on an extremity of one of said fingers and is registering with an end of one of said fibre-optic ribbons.

18. The illuminated glove as claimed in claim 16, wherein said fibre-optic ribbon comprises a reflective backing and said opening is on a top portion of one of said fingers.

19. The illuminated glove as claimed in claim 16, wherein said fibre-optic, arrangement comprises a reflective backing under said plurality of optical fibres and said opening is on said back-of-the-hand portion.

20. The illuminated glove as claimed in claim 19, wherein said opening defines a logo.

* * * * *